Feb. 7, 1950  A. C. OMBERG  2,496,674
SYSTEM FOR GROUND SPEED DETERMINATION
Filed Feb. 2, 1946
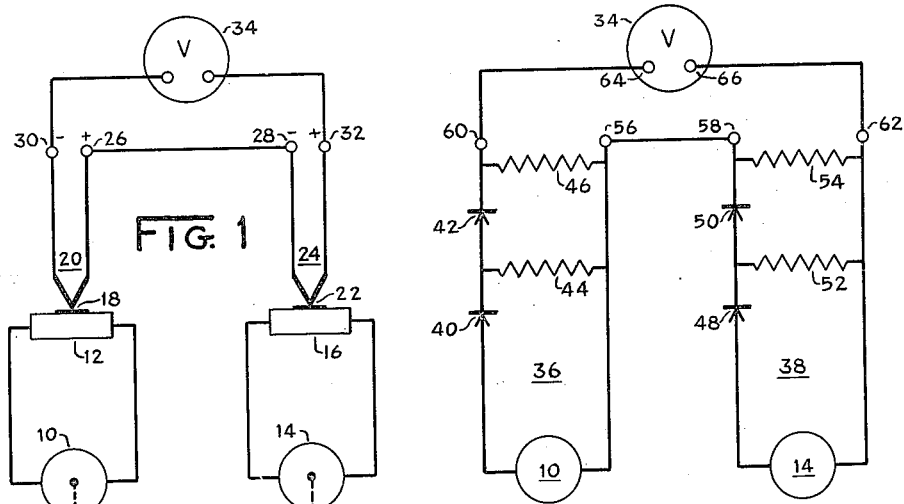
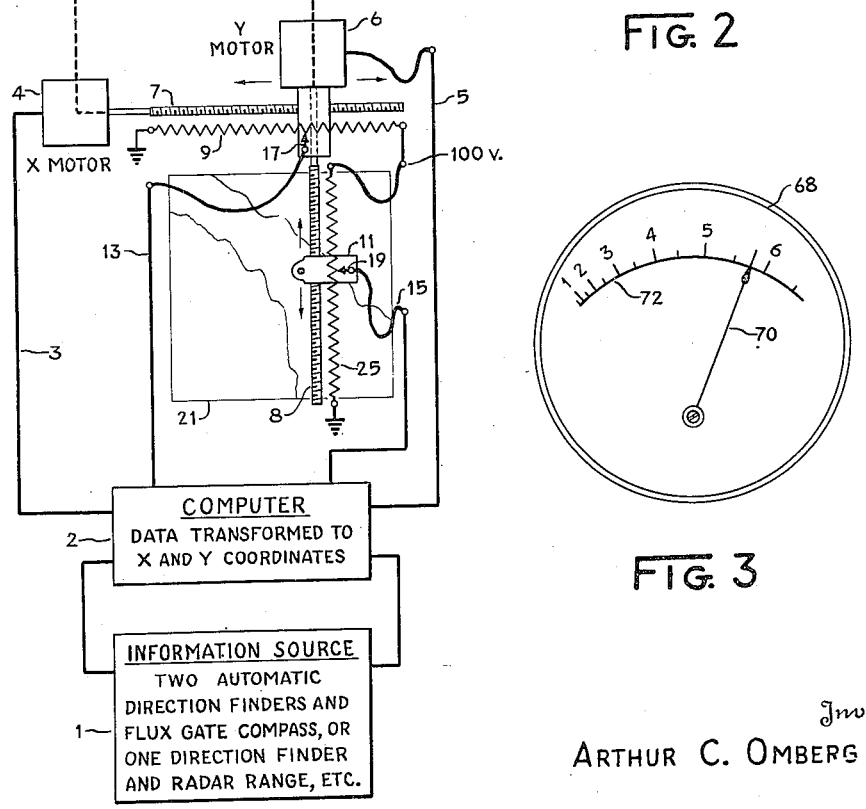
Inventor
ARTHUR C. OMBERG
By Robert T. Killman
Attorney Patented Feb. 7, 1950

2,496,674

UNITED STATES PATENT OFFICE 2,496,674

SYSTEM FOR GROUND SPEED
DETERMINATION

Arthur C. Omberg, Owings Mills, Md., assignor to Bendix Aviation Corporation, Towson, Md., a corporation of Delaware Application February 2, 1946, Serial No. 645,160

1 Claim. (Cl. 235—61)

This invention relates to systems for the determination of the ground speed of air or water borne vehicles, and more particularly to such systems which generate voltages proportional to the components of the ground speed of the vehicle along mutually perpendicular direction lines and combine these voltages vectorially to derive a resultant ground speed.

In the navigation of such vehicles it is highly desirable that the navigator have readily available information as to the speed actually being made good over the ground, in order that progress to a destination may be checked, time of arrival at the destination be accurately estimated and steps taken to correct deviations from a desired rate of progress. In order that human errors may be minimized, crew personnel be reduced to a minimum and information be quickly available for use, it is desirable that some means be provided for automatically, quickly and accurately furnishing the desired information.

It is an object of this invention to provide a method and means for continuously and accurately determining and indicating the ground speed of an air or water borne vehicle.

It is another object of this invention to provide a method and means for deriving the ground speed of the vehicle from information as to the components of the ground speed of the vehicle along mutually perpendicular direction lines.

It is a further object of the invention to provide a method and means for continuously determining from information as to the position of the vehicle with respect to one or more known points in an area being traversed, the rectangular coordinates of said position, and deriving from said coordinates the ground speed of the vessel.

It is still another object of the invention to generate voltages proportional to the components of the ground speed of the vehicle along mutually perpendicular direction lines and to derive from those voltages the ground speed of the vessel.

The objects and advantages of the invention are attained by means computing from information as to the position of a vehicle with respect to one or more known stations, the rectangular coordinates of the vehicle's position, generating voltages proportional to the rate of movement of the vehicle along directions indicated by said coordinates, electrically squaring and combining those voltages and indicating the resultant in terms of its square root.

Other objects and advantages of the invention will become apparent from a consideration of the following specifications when taken in conjunction with the accompanying drawing, in which:

Fig. 1 is a schematic diagram of a system embodying the invention;

Fig. 2 is a schematic diagram of a modified portion of the system of Fig. 1, and;

Fig. 3 is a front elevational view of a dial forming a part of the systems of Figs. 1 and 2.

Referring now more particularly to Fig. 1 of the drawing, the block I indicates a source of information as to the position of the vehicle relative to one or more points of known location. The source may include, for example, two automatic radio direction finders providing bearings of the points and a flux gate compass providing information as to the vehicle's heading. Or it may consist of one automatic direction finder and a distance determining device such, for example, as a pulse echo system. Other combinations of information providing devices may be used, a pair of echo ranging devices providing distances to a plurality of points of known location, or navigational devices providing information as to the difference between the distances to such points.

The information supplied by the source I is applied to computer 2 which converts it into voltages proportional to the rectangular coordinates of the position of the vehicle upon a chart 21 of the area being traversed. In so doing the information is applied to the computer and the output information is derived in terms of an arbitrary voltage-distance scale.

The voltage proportional to the X coordinate, as computed, is applied to a motor 4 which drives a lead screw 7 extending parallel to and spanning the horizontal dimension of the chart 21. Supported on and driven by the lead screw 7 is a cursor 23 carrying a motor 6 which drives a lead screw 8 extending parallel to and spanning the vertical dimension of the chart. The lead screw 8 drives a cursor 11 carrying a stylus which travels over the chart 21 to mark the location of the vessel therein.

Paralleling the lead screw 7 is a potentiometer 9 and paralleling the lead screw 8 is a potentiometer 25. The cursor supporting motor 6 carries a sliding contact 17 and the cursor 11 carries a sliding contact 19, which contacts travel along the respective potentiometers 9 and 25. An arbitrary voltage is applied to the potentiometers, the value of the voltage being in proportion to the chart distance spanned by the potentiometers in terms of the selected voltage-distance scale.

The voltage proportional to the Y coordinate, as developed by the computer 2 is applied to motor 6. The potentials intercepted by the sliding contacts 17 and 19 along the potentiometers are fed back to the computer to reduce the X and Y voltages applied to the motors 4 and 6 as the cursor 11 nears the correct position.

Accordingly, if the vessel is in continuous motion the resultant voltages fed to the motors 4 and 6 and the rotation of lead screws 7 and 8 will be proportional to the velocity components of the vehicle's movement in east-west and north-south directions.

The portion of the system described thus far will be found described more fully and in greater detail in my copending application for Automatic position plotter, Serial No. 642,969, filed January 23, 1946.

In order to determine the resultant ground speed from these components it is necessary to combine them vectorially. The invention contemplates the accomplishment of this result by electrical means, two arrangements for this purpose being illustrated in Figs. 1 and 2.

In the embodiment of Fig. 1 the motor 4 drives a direct or alternating current generator 10 through lead screw 7. The motor 6 likewise drives a direct or alternating current generator 14 through lead screw 8.

The generator 10 is connected to a heater element 12. This element 12 heats the adjacent junction 18 of a thermocouple 20. Likewise, the generator 14 is connected to a heater element 16, which heats the junction 22 of a thermocouple 24. The positive terminal 26 of thermocouple 20 is connected to the negative terminal 28 of thermocouple 24 by series connection of the thermoelements, and the remaining terminals 30 and 32 of the two thermocouples are connected to a metering device 34.

The heat generated in a heater element by the application of a voltage thereto is proportional to the square of the applied voltage. Thus, if $E_1$ is the voltage developed by the power source 10 across the heater element 12, the heat generated in heater element 12 will be proportional to $E_1^2$. Likewise, if the power source 14 develops a voltage $E_2$ across the heater element 16, the heat generated in heater element 16 is proportional to $E_2^2$. Heater element 12 raises the temperature of junction 18 of thermocouple 20, and heater element 16 similarly raises the temperature of junction 22 of thermocouple 24. The electromotive force generated in each thermocouple is proportional to the heat supplied to each junction. Therefore, the E. M. F. developed by thermocouple 20 is proportional to $E_1^2$, and the E. M. F. developed by thermocouple 24 proportional to $E_2^2$. The E. M. F. of the series-connected thermocouples 20 and 24 and the E. M. F. applied to the metering device 34 is therefore proportional to $(E_1^2+E_2^2)$. A reduction in heater input voltage will reduce the temperature thereof, but due to the thermal inertia of such devices, temporary variations of voltage input due to hunting of the motors 4 and 6 will be averaged out, the thermocouple output being proportional to the square of the average input over a small period of time.

In the modification of the system of Fig. 1 illustrated in Fig. 2 and constituting a second embodiment of the invention, generator 10 supplies power to a copper-oxide rectifier 40 through a resistance 44 and to a copper-oxide rectifier 42 through a resistance 46. The two rectifiers 40 and 42 are series-connected and form the rectifier circuit 36. Generator 14 supplies power to a copper-oxide rectifier 48 through a resistance 52, and to a copper-oxide rectifier 50 through a resistance 54. The two rectifiers 48 and 50 are series-connected and form the rectifier circuit 38. The electrically oppositely polarized terminals 56 and 58 of the two rectifier circuits 36 and 38 are connected together thus connecting the rectifier circuits in series. The remaining terminals 60 and 62 of the two rectifier circuits 36 and 38 are connected to the terminals 64 and 66 of the metering device 34. In this embodiment the generators 10 and 14 are of the alternating current variety.

The output voltage of a rectifier circuit of the kind used in this apparatus is a function of the input voltage and the connected resistance. This resistance can be so chosen, that, within the voltage range to be considered, the output voltage of the rectifier circuit is proportional to the square of the input voltage. Generator 10 supplies a voltage $E_1$ to the rectifier circuit 36, in which the two rectifiers 40 and 42 are series-connected in order to more nearly approach the desired linearity voltage output which should be proportional to the square of the input. Through proper choice of the resistors 44 and 46, the rectifier circuit will provide an output voltage proportional to $E_1^2$. Generator 14 supplies the voltage $E_2$ to the rectifier circuit 38, and through proper selection of the resistors 52 and 54 rectifier circuit 38 will develop an output voltage proportional to $E_2^2$. The rectifier circuits 36 and 38 are series-connected. Together they supply a voltage proportional to $(E_1^2+E_2^2)$ to the metering device 34.

In Figure 3 there is shown the dial 68 of the metering device 34 provided with a pointer 70 and a scale 72. It is calibrated in the square roots of the values which would be indicated under consideration of the constants of proportionality which relate the original quantities to be added vectorially to the movement of the pointer 70 of the metering device. If connected as indicated to the circuits described in Figures 1 and 2, the pointer will read the resultant of the two original velocity vectors represented by the voltages generated by the generators 10 and 14. This resultant represents the resultant velocity or ground speed of the vehicle.

Even though the disclosure has been limited to a showing of the derivation of ground speed from voltages proportional to the components of the ground speed of the vessel along east-west and north-south lines, it will be apparent that the derivation may be made with the same means and with equal facility from voltages representing components of ground speed along any pair of mutually perpendicular direction lines.

While the disclosure has been confined to two embodiments of the invention which are now preferred, many changes of form and arrangement falling within the scope of the appended claim will occur to those skilled in the art. It is therefore to be understood that the scope of the invention is not to be considered as limited to the embodiments disclosed herein.

What is claimed is:

In a system for determining the ground speed of a moving vehicle: a pair of movable elements; means causing said elements to move at rates proportional respectively to components of the ground speed of said vehicle along mutually perpendicular direction lines; means deriving from the motion of said elements voltages proportional to said components; a pair of heater elements individually activated by said voltages; a pair of series connected thermocouples individually excited by said heater elements; and a metering device measuring the total voltage developed by said series connected thermocouples, said metering device indicating the square root of the voltage measured by it.

ARTHUR C. OMBERG.

REFERENCES CITED

The following references are of record in the file of this patent:

UNITED STATES PATENTS

| Number | Name | Date |
| --- | --- | --- |
| 2,080,186 | Reymond | Mar. 11, 1937 |
| 2,314,764 | Brown | Mar. 23, 1943 |
| 2,404,387 | Lovell | July 23, 1946 |
| 2,410,707 | Bradley et al. | Nov. 5, 1946 |
| 2,438,112 | Darlington | Mar. 23, 1948 |

FOREIGN PATENTS

| Number | Country | Date |
| --- | --- | --- |
| 633,493 | Germany | Aug. 3, 1936 |
| 499,239 | Great Britain | Jan. 20, 1939 |